US006810319B2

(12) United States Patent
Manaka

(10) Patent No.: US 6,810,319 B2
(45) Date of Patent: Oct. 26, 2004

(54) VEHICLE TO VEHICLE DISTANCE CONTROLLER AND VEHICLE

(75) Inventor: Toshio Manaka, Hitachinaka (JP)

(73) Assignee: Hitachi, Ltd., Tokyo (JP)

(*) Notice: Subject to any disclaimer, the term of this patent is extended or adjusted under 35 U.S.C. 154(b) by 5 days.

(21) Appl. No.: 10/254,531

(22) Filed: Sep. 26, 2002

(65) Prior Publication Data

US 2003/0154016 A1 Aug. 14, 2003

(30) Foreign Application Priority Data

Feb. 8, 2002 (JP) ........................................ 2002-031718

(51) Int. Cl.⁷ ............................ B60K 31/00; B60T 7/12
(52) U.S. Cl. ............................. 701/96; 340/903; 342/70
(58) Field of Search ........................ 701/93, 96; 342/70, 342/71; 340/903, 904; 180/169, 170

(56) References Cited

U.S. PATENT DOCUMENTS

| 4,670,845 | A | * | 6/1987 | Etoh ........................... 701/301 |
| 5,197,562 | A | * | 3/1993 | Kakinami et al. ........... 180/169 |
| 6,185,499 | B1 | * | 2/2001 | Kinoshita et al. ............ 701/96 |
| 6,226,588 | B1 | * | 5/2001 | Teramura et al. ............ 701/93 |
| 6,339,740 | B1 | * | 1/2002 | Seto et al. ...................... 701/96 |
| 6,405,120 | B1 | * | 6/2002 | Higashimata et al. ........ 701/96 |
| 6,430,494 | B1 | * | 8/2002 | Inoue et al. ................... 701/96 |
| 6,493,625 | B2 | * | 12/2002 | Andreas et al. ............... 701/96 |
| 6,678,603 | B2 | * | 1/2004 | Egawa et al. .................. 701/96 |

FOREIGN PATENT DOCUMENTS

| JP | 9263160 | 10/1997 |
| JP | 2001030797 | 2/2001 |

* cited by examiner

Primary Examiner—Michael J. Zanelli
(74) Attorney, Agent, or Firm—Crowell & Moring LLP

(57) ABSTRACT

In a vehicle to vehicle distance control device when a headway distance between a controlled vehicle in which the device is provided and a forward vehicle approaches or falls below a predetermined value a control unit controls the vehicle speed of the controlled vehicle so as to keep the headway distance at a predetermined value. When the device becomes unable to detect the presence of a forward vehicle, a constant speed control is provided for the controlled vehicle using either the controlled vehicle speed before the device became unable to detect the forward vehicle or a corrected vehicle speeds until an accelerator is operated. After the accelerator is operated, speed control is performed using a vehicle speed set by a driver of the vehicle.

12 Claims, 6 Drawing Sheets

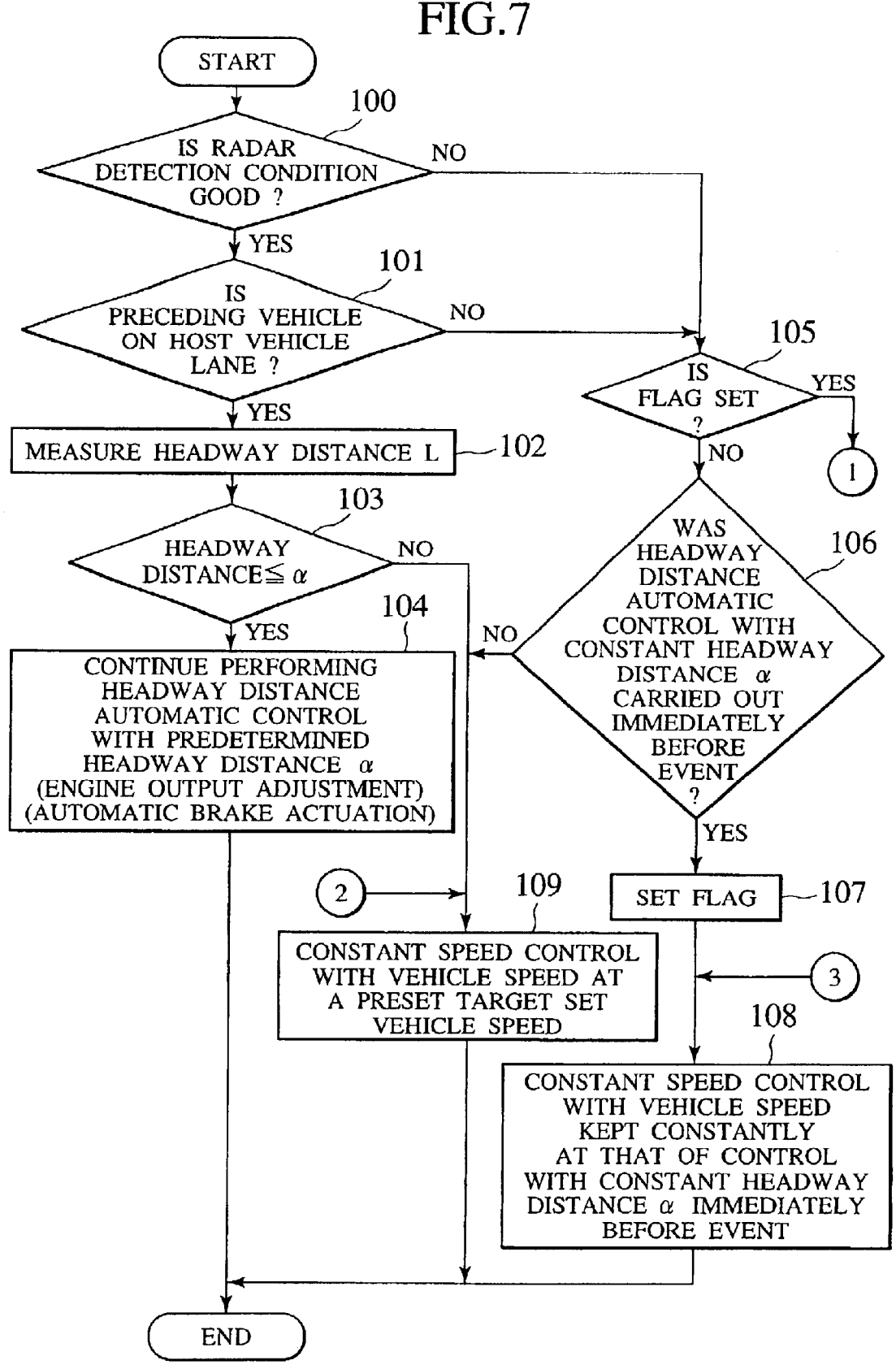

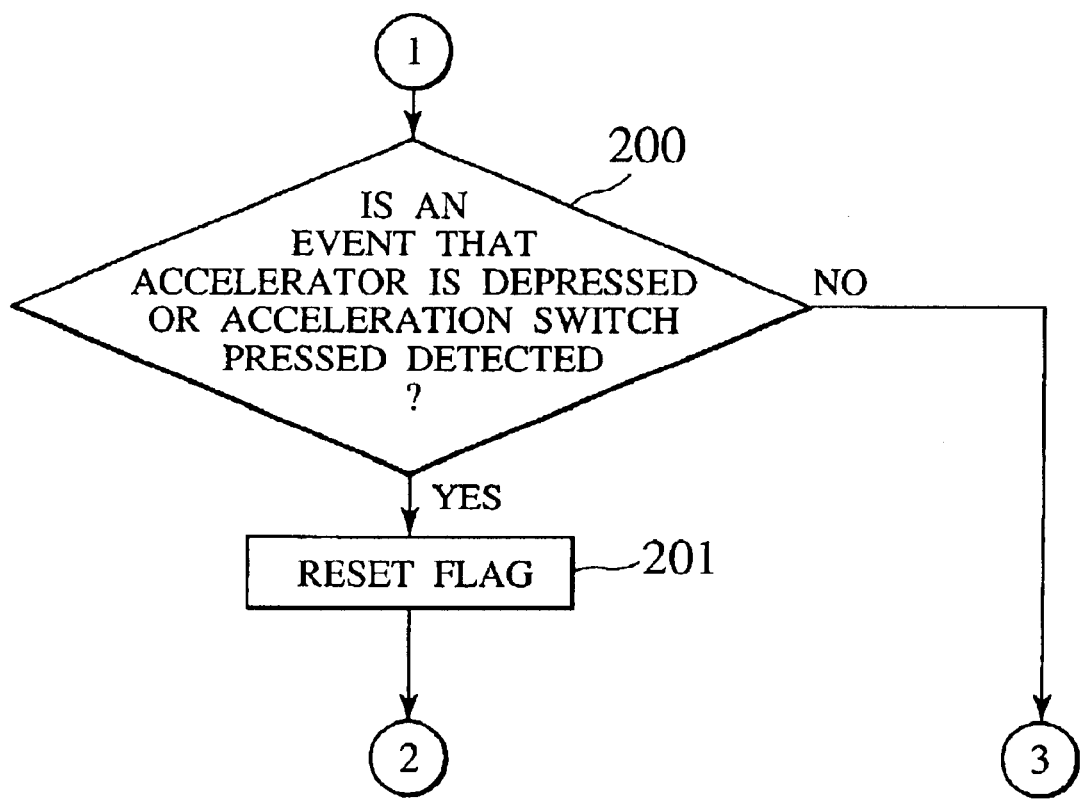

VEHICLE TO VEHICLE DISTANCE CONTROLLER AND VEHICLE

BACKGROUND OF THE INVENTION

The present invention relates to a vehicle speed control adaptive cruise control and vehicle to vehicle distance control device.

Japanese Patent Laid-open Nos. 9-263160 and 2001-30797 disclose a vehicle speed control device. This control device provides, if it becomes unable to detect a forward vehicle, a constant speed control for a predetermined period of time, during which a speed in accordance with a headway distance immediately before the event is maintained, and thereafter restricts gradual acceleration or prevents a shift from a following control (headway distance automatic control) to the constant speed control.

Such a vehicle speed control device, however, shifts from the adaptive cruise control (vehicle to vehicle distance control) mode to the constant speed control mode without clearly identifying a driver's intention. This gives the driver a sense of a timing lag and awkwardness. It could also give the driver, in a variety of occasions, a sense of uneasiness because of a vehicle being accelerated at timings not exactly the driver expects.

SUMMARY OF THE INVENTION

The present invention provides a device that performs, if it becomes unable to detect a forward vehicle, the constant speed control using an actual vehicle speed or a corrected vehicle speed of a subject vehicle immediately before the event and refrains from shifting to the constant speed control using a set vehicle speed preset by the driver until the driver depresses an accelerator pedal.

The invention can prevent the vehicle from being accelerated unexpectedly.

BRIEF DESCRIPTION OF THE DRAWINGS

Other objects and advantages of the invention will become apparent from the following description of embodiments with reference to the accompanying drawings in which:

FIG. 7 is a flowchart of the present invention; and

FIG. 8 is a flowchart of the present invention.

DESCRIPTION OF THE PREFERRED EMBODIMENTS

Figure 1:
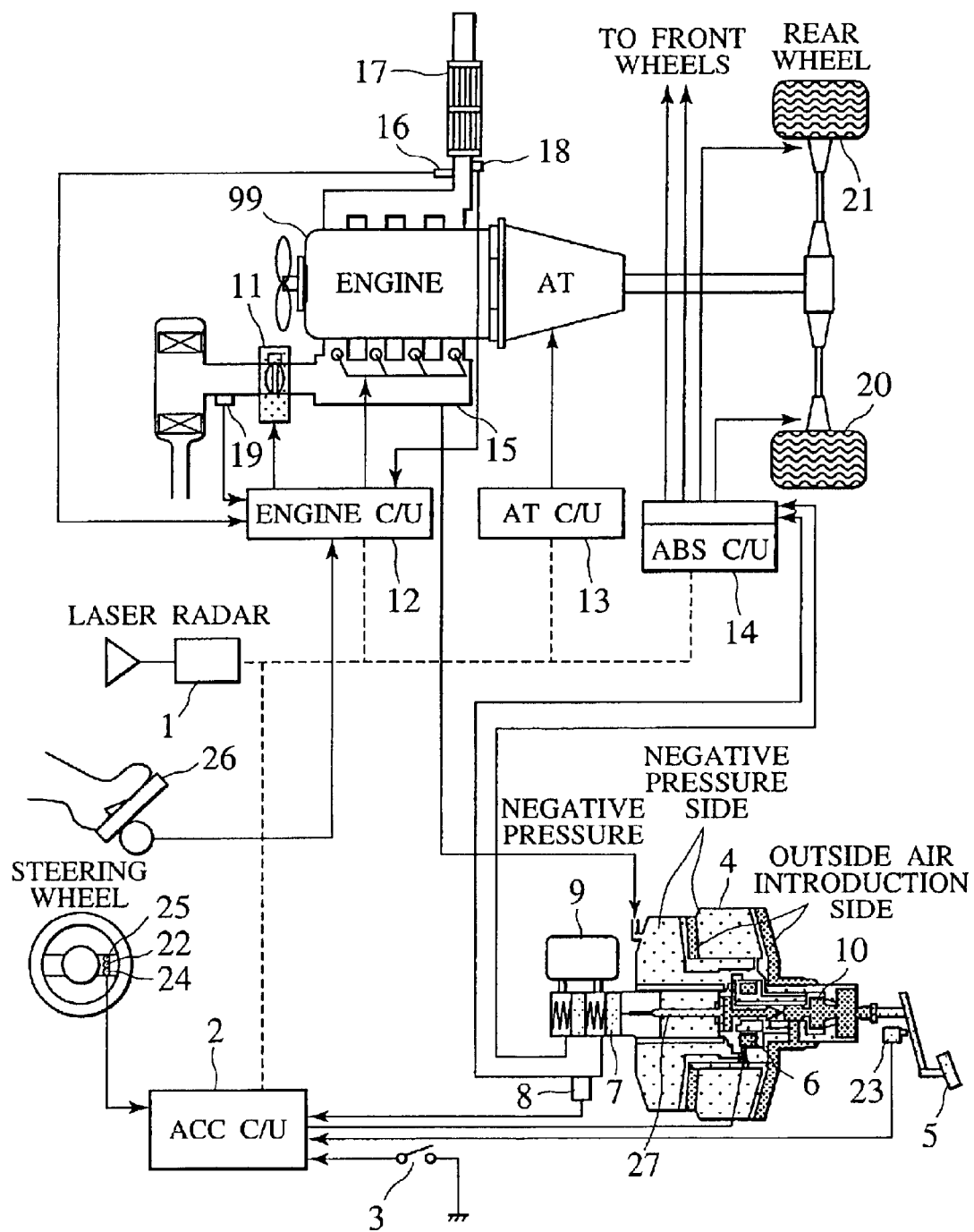
FIG. 1 is a system diagram of a control device according to the present invention.

FIG. 1 is a system diagram showing one embodiment of vehicle to vehicle distance control (an adaptive cruise control) device according to the present invention. Information on a headway distance from a forward vehicle, a relative speed, and a yaw rate of a subject vehicle is sent from a radar 1 by way of communication lines (dotted line) to an ACC control unit 2. The ACC control unit 2 provides a feedback control based on these pieces of information by adjusting an output from an engine 99 so as to maintain a predetermined vehicle speed for the subject vehicle. The radar 1 may be either one of the following two types. One emits forward a laser and receives a wave reflected off the forward vehicle. The other transmits forward a radio wave of extremely high frequencies and receives a wave reflected off the forward vehicle.

When the headway distance between the subject vehicle and the forward vehicle becomes a predetermined value or less, the ACC control unit 2 decreases the output from the engine. If deceleration is not sufficient, the device applies a current to a solenoid (solenoid valve) 6 of a brake booster 4 so as to apply an automatic brake, thereby maintaining a predetermined headway distance. The force of the brake can be known by detecting a master cylinder pressure using a pressure sensor 8. When the current is applied to the solenoid (solenoid valve) 6, it opens a valve 10, allowing an outside air into the booster. This produces a differential pressure from a vacuum allowed into the brake booster through an intake pipe 15 of an engine. This causes an output rod 27 to push a piston in a master cylinder 7. As a result, the boosted master cylinder pressure is introduced to a brake caliper of a front wheel and a rear wheel by way of an ABS unit 14, causing a brake pad to push a brake disc. This is how the brake is applied.

An engine control unit 12 controls an electronically controlled throttle valve 11 based on a torque demand command transmitted from the ACC control unit 2 over the communication line, thereby increasing or decreasing the engine output. An AT control unit 13 controls a gear position of an automatic transmission. It sends information on the subject vehicle speed and the AT gear position to the ACC control unit 2 over the communication line. This allows the ACC control unit 2 to perform a constant speed control (or an auto cruise) and vehicle to vehicle distance control (an adaptive cruise control). The constant speed control (auto cruise) means to maintain a vehicle speed set by a driver for the subject vehicle. The headway distance automatic control, on the other hand, means to maintain a predetermined headway distance from the forward vehicle when it becomes shorter as a result of the forward vehicle's running at a speed lower than the set vehicle speed of the subject vehicle.

Figure 2:
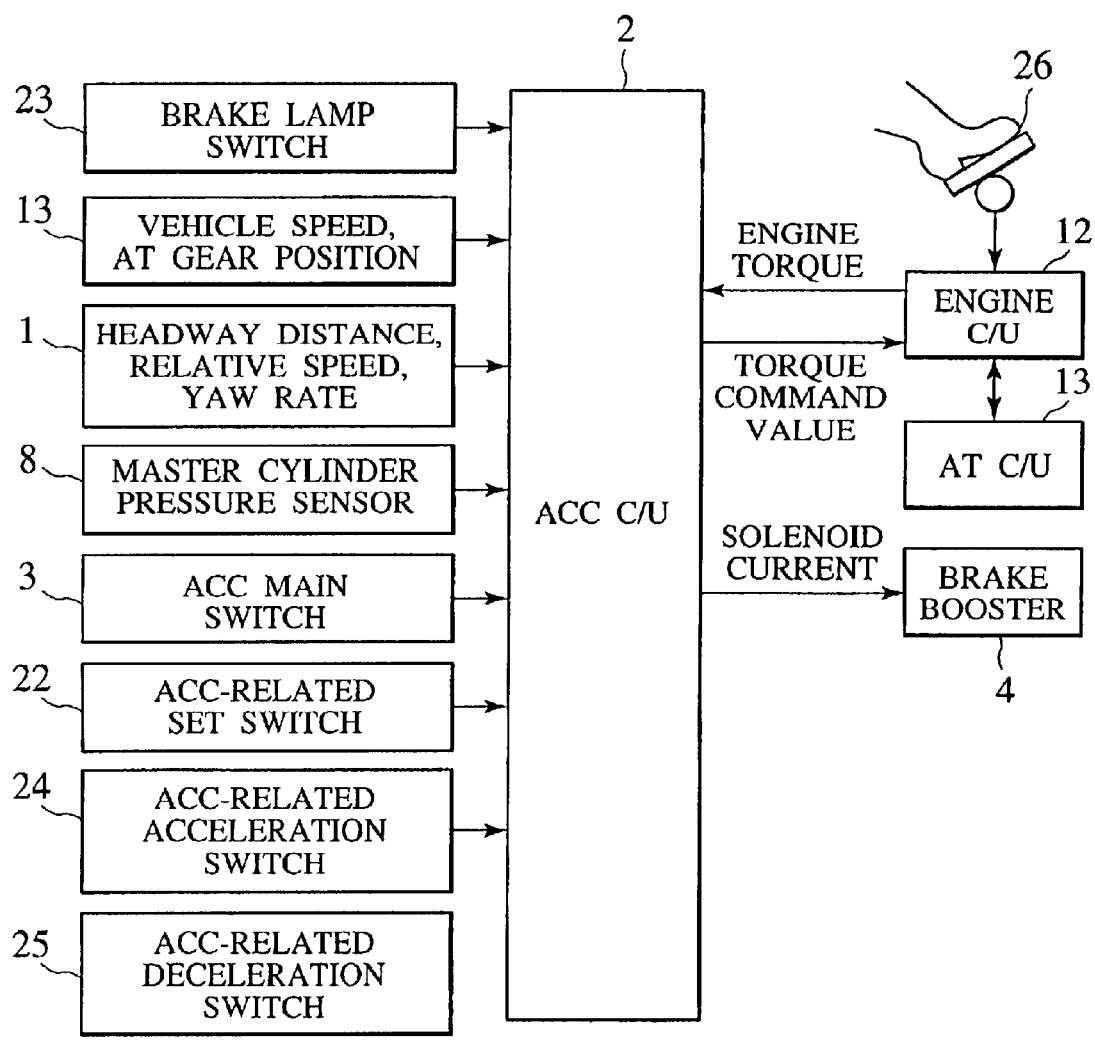
FIG. 2 is a control block diagram.

FIG. 2 is a control block diagram of the ACC control unit 2. The ACC control unit 2 receives, as inputs thereto, information on a brake lamp switch 23, a subject vehicle speed 13, an AT gear position 13, a headway distance from the forward vehicle 1, a relative speed 1, a yaw rate 1, a master cylinder pressure 8, a throttle opening signal (a throttle angle signal), an ACC main switch 3, an ACC-related set switch, and signals 22, 24, 25. Based on these pieces of information, the ACC control unit 2 transmits a torque command value to the engine control unit 12 so as to adjust the engine output and thus maintain the vehicle speed set by the driver.

If the headway distance becomes shorter than the predetermined value because of a slow-running forward vehicle, the engine output is decreased. If that is not sufficient, an automatic brake is applied by applying a current to the solenoid 6 of the brake booster 4. This keeps the headway distance constant. While controlling the engine output to the torque command value, the engine control unit 12 transmits information required for gear position control to the AT control unit.

The ACC main switch 3 is used to perform the constant speed control (auto cruise) and the headway distance automatic control. It is not the only single source to start the control. When the driver operates the ACC-related set switch 22, an acceleration switch 24, or a deceleration switch 25 disposed in a steering wheel, it starts the control or sets a vehicle speed. Each press of the acceleration switch 24 increases a target set vehicle speed by a predetermined margin. Each press of the deceleration switch 25 decreases the target set vehicle speed by a predetermined margin. The vehicle speed during a constant speed control following an event, in which the device becomes unable to detect the forward vehicle, shifts to one immediately before the event. If the acceleration switch 24 is pressed or an accelerator pedal 26 is depressed during this time, the vehicle speed shifts to the target set vehicle speed preset by the driver as maintained through the constant speed control. In the same way, if the forward vehicle deviates from a position forward in relation to the subject vehicle or the lane in which the subject vehicle runs, a constant speed control is provided using a constant vehicle speed of that immediately before the event, in which the forward vehicle deviates from the lane. If the acceleration switch 24 is pressed or the accelerator pedal 26 is depressed during this constant speed control, the constant speed control shifts its speed to the target set vehicle speed preset by the driver. The accelerator switch and the accelerator pedal are generically named an acceleration means which includes an acceleration button and other devices that accelerate the subject vehicle.

Instead of using a signal indicating that the accelerator pedal is stepped on, another indicator may still be used. It may be an indicator indicating any of a fuel injection amount, a fuel injection pulse width, an intake air flow rate, a throttle opening, a torque, and an intake manifold pressure indicating an increase in the engine output. Or it may be a current value indicating an increase in a motor output. The intake air flow rate offers a high accuracy, as it can be directly measured using an air flow meter. The throttle opening also offers a high accuracy, as it can again be directly measured using a throttle position sensor or the like. The event, in which the device becomes unable to detect the forward vehicle, is a case, in which the radar is not effective enough to detect the forward vehicle because of a road surface, road environment, weather, or other disturbances that may cause the forward vehicle to fall outside a detectable range. The event, in which the forward vehicle deviates from the position forward in relation to the subject vehicle or the lane in which the subject vehicle runs, is a case, in which it is determined that the forward vehicle deviates from a host lane as estimated through radar detection.

Figure 3:
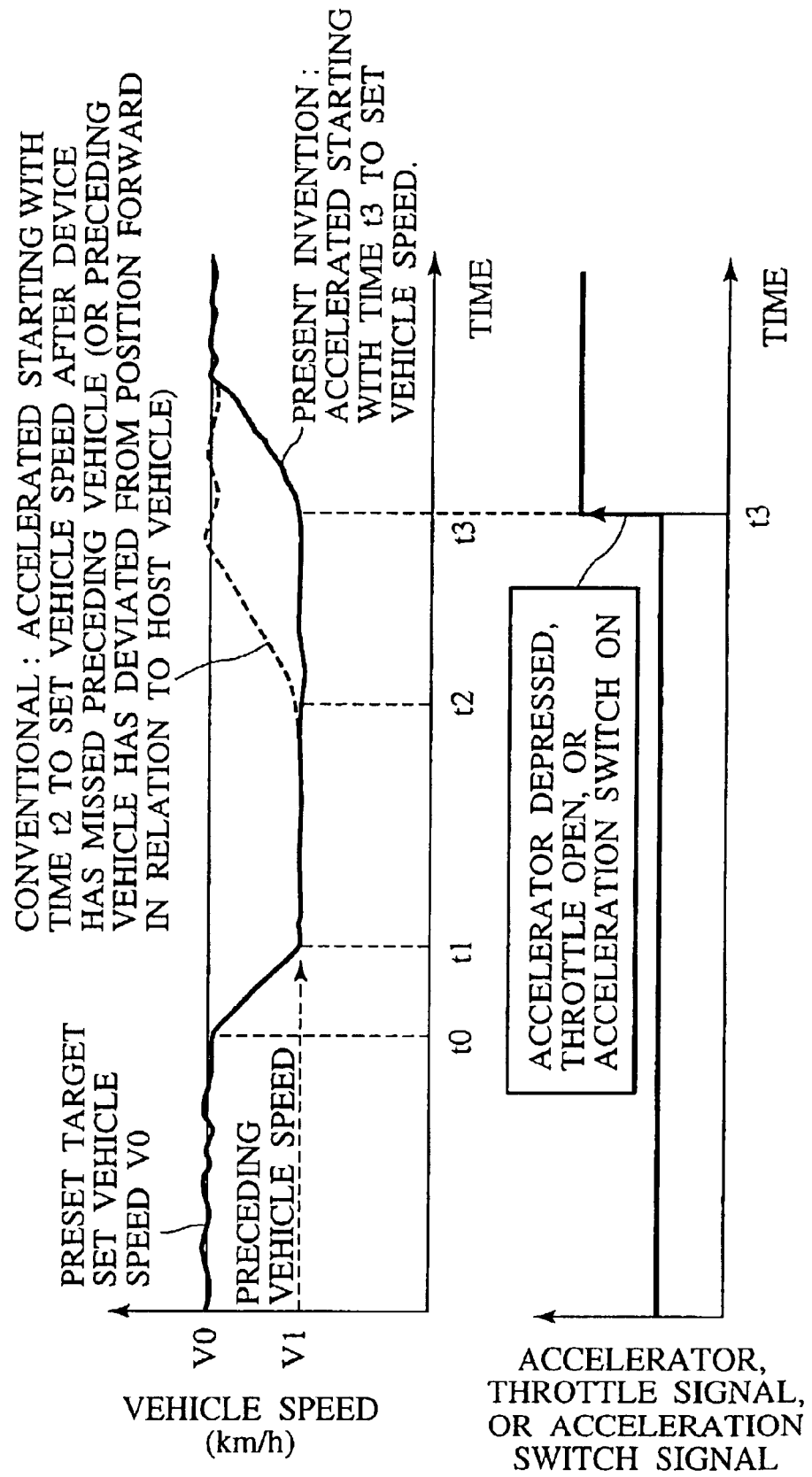
FIG. 3 is a drawing illustrating operations of the present invention.

FIG. 3 is a drawing illustrating operations of the preferred embodiment according to the present invention. FIG. 3 shows a case, in which the subject vehicle that runs at a target set vehicle speed V0 starts approaching, with a time t0, the forward vehicle that runs at a vehicle speed V1. The vehicle speed V1 is lower than the vehicle speed V0. The subject vehicle decelerates down to the same vehicle speed V1 as the forward vehicle up to a time t1 to maintain a predetermined headway distance. The device becomes unable to detect the forward vehicle, or determines that the forward vehicle has deviated from a position forward in relation to the subject vehicle or the lane in which the subject vehicle runs at a time t2. It then allows the vehicle to continue accelerating up to the target set vehicle speed V0 according to the conventional art.

Figure 4:
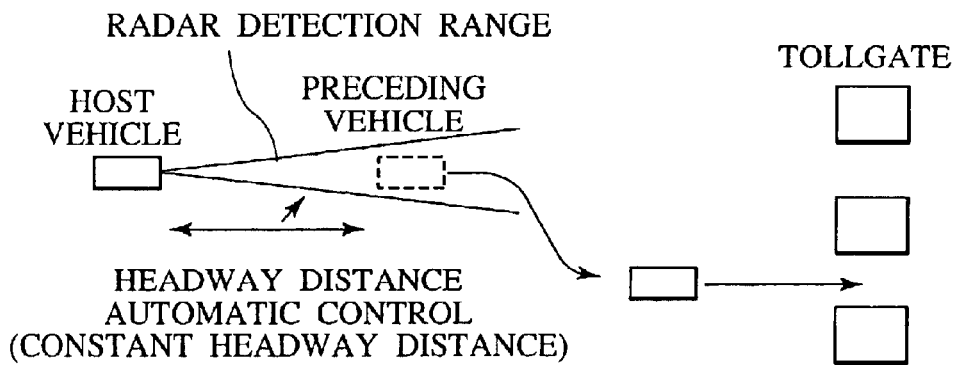
FIG. 4 is a drawing illustrating operations of the present invention.
Figure 5:
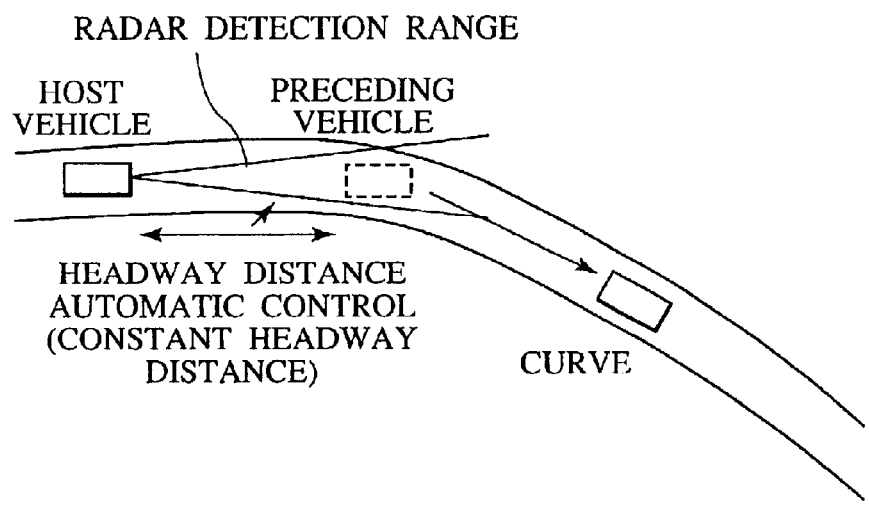
FIG. 5 is a drawing illustrating operations of the present invention.
Figure 6:
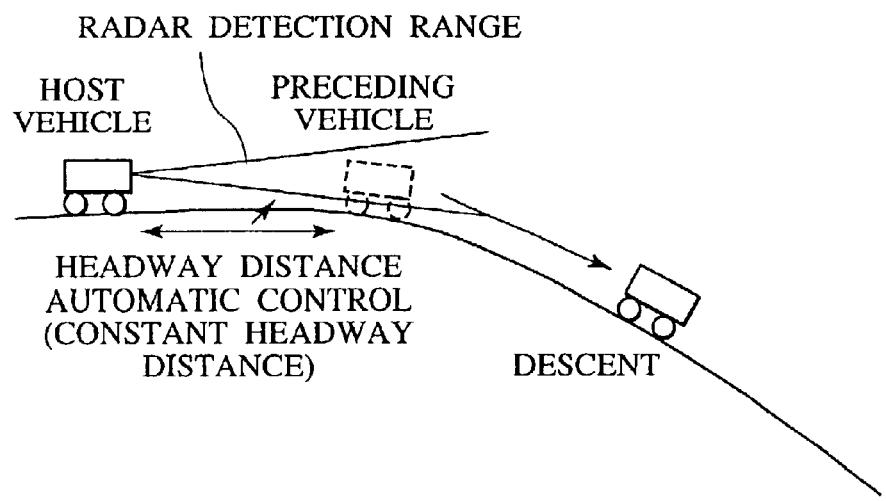
FIG. 6 is a drawing illustrating operations of the present invention.

According to the preferred embodiment of the present invention, the device allows the vehicle to continue accelerating up to the target set vehicle speed V0 beginning with a time t3, at which the device detects a driver's intention as expressed through either the acceleration switch being turned ON, the accelerator pedal being depressed, or the throttle being opened. This eliminates the possibility of acceleration taking place against the intention of the driver even in cases shown in FIGS. 4, 5, and 6. FIG. 4 shows a case, in which the forward vehicle deviates from a position forward in relation to the subject vehicle because of its approaching a tollgate of an expressway. FIG. 5 shows a case, in which the forward vehicle deviates from a position forward in relation to the subject vehicle as it enters a curve. FIG. 6 shows a case, in which the forward vehicle deviates from a position forward in relation to the subject vehicle as it enters a descent. When a vehicle drives past a tollgate, it usually slows down. According to the technique employed in the preferred embodiment of the present invention, there is no chance of acceleration occurring against the driver's intention. When going through a curve, the vehicle can be prevented from accelerating at a point with the greatest curvature depending on the curvature involved. It can therefore be avoided that the vehicle bulges more than the curvature in a curve. It is considered that the preferred embodiment according to the invention has an outstanding effect in a descent and there is no chance of making the driver uneasy.

FIG. 7 shows a flowchart for the preferred embodiment of the present invention.

In step 100, it is determined whether or not a radar detection condition is good. If it is determined that radar detection is good, it is then determined in step 101 whether or not the forward vehicle is in the lane, in which the subject vehicle runs. In step 100, it is checked to see whether the radar is fully operational in detecting the forward vehicle. The radar of the subject vehicle is capable of calculating a bearing and a relative speed of the forward vehicle and the headway distance therefrom using a radio wave or a laser beam reflected off the forward vehicle after the radar has emitted the wave or the beam to the forward vehicle. It is therefore possible to determine, based on the calculated values and the width of the subject vehicle lane, if the forward vehicle is in the subject vehicle lane. If it is determined that the forward vehicle is in the subject vehicle lane, a headway distance from the forward vehicle L is measured in step 102. It is then determined in step 103 whether the measured value is a predetermined headway distance a or less. If it is determined that the measured value is the predetermined headway distance a or less, vehicle to vehicle distance control (an adaptive cruise control) with a constant headway distance a is performed in step 104. The headway distance automatic control is performed by mainly adjusting the engine output. If the headway distance shortens even by making the engine output zero, an automatic brake is actuated. The automatic brake is applied by applying a current to the solenoid (solenoid valve) 6 of the brake booster 4. The engine output is regulated by increasing or decreasing the amount of intake air or the amount of fuel supplied for the engine. It is also possible to apply the brake by changing a gear of a transmission to a low-speed position. If the headway distance from the forward vehicle is away from α, a constant speed control is performed to target the vehicle speed at a preset target set vehicle speed in step 109. If step 100 or step 101 is answered NO, it is determined whether a flag is set or not in step 105. If the flag is not set, it is determined in step 106 whether or not the constant speed control with the constant headway distance α was performed immediately before the event. If step 106 is answered YES, the flag is set in step 107. Then in step 108, the constant speed control is performed with the vehicle speed kept at that of the constant speed control with the constant headway distance a performed immediately before the event. At this time, it is perfectly okay to perform the constant speed control with the constant headway distance α, with the constant vehicle speed corrected as may be necessary according to road environment and traffic conditions. If it is determined that the flag is set in step 105, it is determined in step 200 of FIG. 8 whether or not an event that the accelerator pedal is depressed or the acceleration switch (24) is pressed is detected. If step 200 is answered YES, the flag is reset in step 201 and the constant speed control is performed to target the vehicle speed at the preset target set vehicle speed in step 109 of FIG. 7. If step 200 is answered NO, the constant speed control is performed in step 108 of FIG. 7 to target the vehicle speed at the constant vehicle speed used in the constant speed control with the constant headway distance a performed immediately before the event.

As explained in the foregoing descriptions, if an event occurs in which the headway distance automatic control device becomes unable to detect the forward vehicle, it performs the constant speed control using the vehicle speed of the subject vehicle immediately before the event or a corrected one. Further, it shifts to the constant speed control with a set vehicle speed preset by the driver only after the accelerator pedal has been depressed. This prevents unexpected acceleration from occurring, which does not make the driver uneasy. In addition, the device can prevent the subject vehicle from rapidly approaching the forward vehicle as a result of acceleration that takes place when the following control (headway distance automatic control) is shifted to the constant speed control. This shift of control occurs after the device becomes unable to detect the forward vehicle in front of a tollgate or an exit (before an oncoming curve) of an expressway.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A vehicle to vehicle distance control device comprising:
    first means for detecting a vehicle forward of a subject vehicle on which said distance control device is provided; and
    second means, operative when a headway distance between the subject vehicle and the forward vehicle approaches or falls below a predetermined value, for controlling vehicle speed of the subject vehicle so as to keep the headway distance at the predetermined value; wherein,
    when said first means becomes unable to detect the forward vehicle, said second means controls said vehicle speed to a constant speed for the subject vehicle using one of the vehicle speed before the first means became unable to detect the forward vehicle and a corrected vehicle speed, until an accelerator is operated; and
    said second means controls said vehicle speed using a vehicle speed set by a driver, after the accelerator is operated.

2. The distance control device according to claim 1, wherein:
    when the first means becomes unable to detect the forward vehicle, said second means controls said vehicle speed to a constant speeds using one of the vehicle speed before the first means became unable to detect the forward vehicle and a corrected vehicle speed, until a signal indicating an increase in an engine or motor output is detected, and
    the second means changes to a constant speed control, using a vehicle speed set by a driver, after the indicating signal indicating an increase has been detected.

3. A vehicle to vehicle distance control device comprising:
    first means for detecting a vehicle forward of a subject vehicle on which said distance control device is provided; and
    second means, operative when a headway distance between the subject vehicle and the forward vehicle approaches or falls below a predetermined value during a constant speed control, for controlling vehicle speed of the subject vehicle by one of adjusting a power drive output and actuating a brake of the subject vehicle, that the headway distance becomes the predetermined value herein,
    when the first means detects a situation in which it is no longer able to detect the forward vehicle, in which the forward vehicle departs from a position forward in relation to the subject vehicle or in which the forward vehicle departs from a lane in which the subject vehicle runs, said second means controls said vehicle speed to a constant speed, using one of the vehicle speed immediately before the first means detected said situation and a corrected vehicle speed, until an accelerator is operated; and
    the second means changes to a constant speed control, using a vehicle speed set by a driver, after the accelerator is operated.

4. A vehicle to vehicle distance control device comprising:
    first means for detecting a vehicle forward of a subject vehicle on which said distance control device is provided; and
    second means, operative when a headway distance between subject vehicle and the forward vehicle approaches or falls below a predetermined value during a constant speed control, for controlling vehicle speed of the subject vehicle by one of adjusting a power drive output and actuating a brake of the subject vehicle, such that the headway distance becomes the predetermined value; wherein,
    when the first means detects a situation in which the forward vehicle departs from a position forward in relation to the subject vehicle or in which the forward vehicle departs from a lane in which the subject vehicle runs, said second means controls said vehicle speed to a constant speed, using one of the vehicle speed before the first means detected said situation and a corrected vehicle speed, until an accelerator is depressed; and
    the second means changes to a constant speed control using a vehicle speed set by a driver, after the accelerator is depressed.

5. The distance control device according to claim 4, wherein:
    when the first means detects said situation, said second means controls said vehicle speed to a constant speed, with the vehicle speed kept constantly at one of the vehicle speed immediately before the first means detected said situation and a corrected vehicle speed, until a signal indicating an increase in engine or motor output is detected; and the second means changes to a constant speed control, using a vehicle speed set by a driver, after the output increase indicating signal has been detected.

6. The distance control device according to claim 2, wherein:

a signal indicating an increase in engine output comprises a signal indicating one of a fuel injection amount, a fuel injection pulse width, a torque, and an intake manifold pressure; and a signal indicating an increase in motor output comprises a signal indicating an electric current value.

7. The distance control device according to claim 2, wherein a signal indicating an increase in the engine output comprises a signal indicating a throttle opening.

8. The distance control device according to claim 2, wherein a signal indicating an increase in the engine output comprises a signal indicating an amount of intake air.

9. A controlled vehicle comprising:

first means for detecting a forward vehicle that runs ahead of a the controlled vehicle with no other vehicles therebetween; and second means for controlling a headway distance so as to cause said controlled vehicle to follow the forward vehicle; wherein, when the first means becomes unable to detect the forward vehicle, said second means controls vehicle speed of said controlled vehicle to maintain a vehicle speed at which the controlled vehicle runs to follow the forward vehicle, until a driver operates an accelerator device; and said second means controls said vehicle speed using a vehicle speed set by the drivers after the driver has operated the accelerator device.

10. The controlled vehicle according to claim 9, wherein, if the first means becomes unable to detect the forward vehicle as a result of the forward vehicle's entering a curve, whereby the forward vehicle deviates from the position forward in relation to the controlled vehicle, said second means controls vehicle speed to maintain the vehicle speed at which the controlled vehicle runs to follow the forward vehicle, until the driver operates the accelerator device.

11. The controlled vehicle according to claim 9, wherein, if the first means becomes unable to detect the forward vehicle as a result of the forward vehicle's entering a descent, whereby the forward vehicle deviates from the position forward in relation to the controlled vehicle, said second means controls vehicle speed to maintain the vehicle speed at which the controlled vehicle runs to follow the forward vehicle, until the driver operates the accelerator device.

12. The controlled vehicle according to claim 9, wherein said first means detects that it is unable to detect the forward vehicle when the forward vehicle approaches a tollgate of an expressway, whereby the forward vehicle deviates from the position forward in relation to the subject vehicle.

* * * * *